(12) United States Patent
Patel et al.

(10) Patent No.: US 10,560,325 B2
(45) Date of Patent: Feb. 11, 2020

(54) METHOD AND APPARATUS FOR PROVIDING A BULK MIGRATION TOOL FOR A NETWORK

(71) Applicant: AT&T Intellectual Property I, L.P., Atlanta, GA (US)

(72) Inventors: Minal Patel, Piscataway, NJ (US); Sarmila Bose, Plano, TX (US); Jan Saferite, Blue Springs, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 230 days.

(21) Appl. No.: 14/971,932

(22) Filed: Dec. 16, 2015

(65) Prior Publication Data

US 2017/0180196 A1 Jun. 22, 2017

(51) Int. Cl.
*G06F 15/173* (2006.01)
*H04L 12/24* (2006.01)

(52) U.S. Cl.
CPC .................. *H04L 41/084* (2013.01)

(58) Field of Classification Search
CPC .................................................. H04L 41/084
USPC ....................................................... 709/220
See application file for complete search history.

(56) References Cited

U.S. PATENT DOCUMENTS

| 7,428,299 | B2 | 9/2008 | Pilon et al. |
| 8,082,335 | B2 | 12/2011 | Mishra et al. |
| 8,135,857 | B1* | 3/2012 | Eng ..................... H04L 12/6418 709/238 |
| 2003/0028555 | A1 | 2/2003 | Young et al. |
| 2009/0089412 | A1* | 4/2009 | Nagai ..................... G06F 15/16 709/223 |

(Continued)

FOREIGN PATENT DOCUMENTS

| EP | 2051536 | 9/2009 |
| WO | WO 2015/054300 | 4/2015 |

OTHER PUBLICATIONS

Andrade, Diogo V, "Grasp With Path-Relinking for Network Migration Scheduling". Oct. 31, 2006. pp. 1-7.

(Continued)

*Primary Examiner* — Vivek Srivastava
*Assistant Examiner* — Sibte H Bukhari

(57) ABSTRACT

A method and apparatus for providing a bulk migration tool are disclosed. The method receives a request for performing a bulk migration from a first network component to a second network component, extracts for the bulk migration a configuration from the first network component, generates for the bulk migration, a configuration for the second network component in a configuration language of the second network component in accordance with the configuration extracted from the first network component, configures the second network component with the configuration that is generated, issues an order for performing the bulk migration, wherein the bulk migration is to be performed during a cutover schedule, determines whether the particular bulk migration is performed successfully, activates the configuration for the second network component, when the bulk migration is performed successfully, and deactivates the configurations for the first network component, when the bulk migration is performed successfully.

20 Claims, 4 Drawing Sheets

(56) References Cited

U.S. PATENT DOCUMENTS

| | | | |
|---|---|---|---|
| 2009/0216867 A1* | 8/2009 | Pusateri | H04L 41/022 709/222 |
| 2010/0292976 A1* | 11/2010 | Newcombe | G06F 17/5004 703/13 |
| 2011/0032830 A1* | 2/2011 | Merwe | H04L 45/586 370/251 |
| 2011/0158111 A1 | 6/2011 | Proulx et al. | |
| 2011/0246669 A1* | 10/2011 | Kanada | G06F 9/4856 709/238 |
| 2012/0151061 A1* | 6/2012 | Bartfai-Walcott | G06F 9/4856 709/226 |
| 2016/0328252 A1* | 11/2016 | Singh | G06F 9/455 |
| 2017/0003736 A1* | 1/2017 | Turon | H04L 12/2816 |

OTHER PUBLICATIONS

Ghebretensaé, Zere, "Mobile Broadband Backhaul Network Migration from TDM to Carrier Ethernet". Oct. 2010. pp. 1-8.

* cited by examiner

METHOD AND APPARATUS FOR PROVIDING A BULK MIGRATION TOOL FOR A NETWORK

The present disclosure relates to a method and apparatus for providing a bulk migration tool for a network, e.g., for migrating customer circuits in bulk from one router to another router in a network, e.g., a network of a communications service provider.

BACKGROUND

As Internet usage continues to grow, network components or equipment, e.g., routers, switches, ports, etc., may reach a limit on their capacities. For example, a router may reach its capacity for ports, route tables, etc. Customers may then need to be migrated from older network equipment to newer network equipment. However, services being provided over the older network equipment may be interrupted during the migration.

SUMMARY OF THE DISCLOSURE

In one embodiment, the present disclosure teaches a method and apparatus for providing a bulk migration tool for a network, e.g., a network of a service provider. For example, the method receives a request for performing a bulk migration from a first network component to a second network component, extracts for the bulk migration one or more configurations from the first network component, generates for the bulk migration, one or more configurations for the second network component in a configuration language of the second network component in accordance with the one or more configurations extracted from the first network component, configures the second network component with the one or more configurations that are generated, issues an order for performing the bulk migration, wherein the bulk migration is to be performed during a cutover schedule, determines whether the particular bulk migration is performed successfully, activates the one or more configurations for the second network component, when the bulk migration is performed successfully, and deactivates the one or more configurations for the first network component, when the bulk migration is performed successfully.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
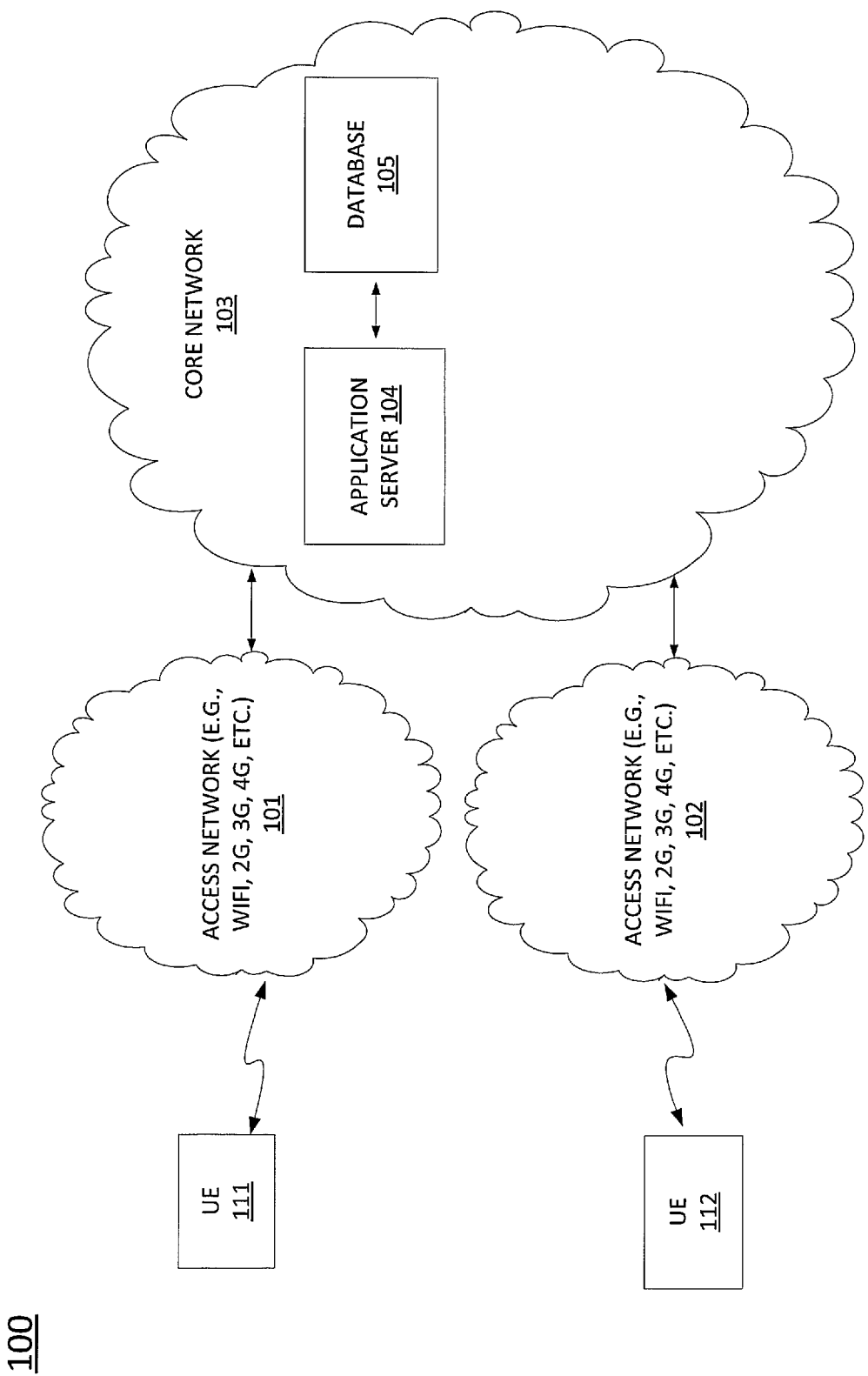
FIG. 1 illustrates an example network related to the present disclosure.

The present disclosure relates to a method and apparatus for providing a bulk migration tool for a network, e.g., a network of a communications service provider. The teachings of the present disclosure can be applied to any type of wired communications network.

Due to increases in network usage, a network component may start operating at or near an exhaust level. For example, when more and more customer circuits are added to routers, address spaces that can be managed by routing tables in the various routers may become unmanageably large. For instance, when new Internet Protocol (IP) addresses of customers are configured, other routers need to update their respective routing tables to include the new IP addresses. The service provider may then wish to migrate services from an older network platform to a new network platform that is designed to handle a larger number of services and/or customers. For example, the network service provider may deploy newer routers that can manage larger number of customer circuits. However, the migration activities on the network of the service provider may disrupt services currently being provided on the older routers for an extended period of time. For example, if the router of the old platform was supporting 20,000 customer circuits, it may take months to move 20,000 individual circuits to another router on the new platform. In addition, once the service provider performs the migration on the service provider's side of the network, the customers may have to reconfigure their respective user endpoint devices (e.g., at the customer locations) to interoperate with the network of the service provider. Moreover, tests and verifications may need to be performed on the new reconfigurations prior to allowing the services to resume. As such, customers would benefit from a bulk migration tool for migrating a network of a service provider that performs the migration without interrupting services and without requiring the customers to perform reconfigurations on user endpoint devices at their respective locations.

In order to clearly illustrate the teachings of the current disclosure, the following terminologies will first be described:

Connection based migration; and

Pipe based migration.

Connection based migration refers to a migration at an individual circuit level of a connection of a customer (e.g., a user) endpoint device to a network service provider device. For example, if 20,000 circuits supporting 20,000 customers are being migrated from one router to another router, each of the 20,000 circuits is migrated individually. For instance, a work center may notify all the 20,000 customers of the migration plan, perform 20,000 individual circuit level migrations during a designated time, e.g., a time reserved for a cutover, notify all the 20,000 customers to let them know when the migration on the network side is completed, and enable the 20,000 customers to configure their respective user endpoint devices. The connection based migrations may be implemented via two orders that comprise: an add order for adding a new circuit to support a customer on the new router, and a disconnect order for disconnecting a previous circuit that supported the same customer. The add order requires reconfiguration of the customer user endpoint devices, e.g., the customer routers, with new internet protocol (IP) addresses. The disconnect order cancels the previous IP addresses. In other words, when the pair of add and disconnect orders is issued, the network service provider assigns a new IP address to the customer. The new IP address is selected from addresses in a range of addresses supported by the new router. In order to reach the new router supporting the customer, the customer endpoint device then needs to be reconfigured with the new IP address. Once the reconfiguration of the customer endpoint device is completed, the new connectivity and turn-up are tested and verified. As such, connection based migration is labor intensive.

Pipe based migration refers to a migration of circuits in bulk, wherein the migration is performed without having individual interactions with customers or altering configurations on customer endpoint devices. The pipe based migration is performed within a maintenance window of time while maintaining current network configurations on the customer endpoint devices (i.e., customer network configurations), including retention of existing IP addresses. For example, a pipe based migration of the above 20,000 customers from one router to another router would occur within a maintenance window of time without changing the 20,000 customer IP addresses, without changing configurations on the 20,000 customer endpoint devices, and without issuing 20,000 pairs of add/disconnect orders. Since the pipe based migration occurs within the maintenance window of time without affecting the customer configurations, a benefit of the pipe base migration is that it requires little to no customer involvement for the migration. In fact, the customer may not even know that the pipe based migration has occurred.

In one embodiment, the present disclosure provides a pipe based migration for transforming the service provider's network at a Layer 1, Layer 2, or Layer 3 level of a standard Open Systems Interconnection (OSI) stack without affecting Layers 4-7. For clarity, the usage of the various layers of the OSI stack by the method of the present disclosure is provided herein.

Layer 1 is a physical layer for transmitting bit streams through a network at an electrical or optical level. For example, the hardware of the service provider network is part of the Layer 1 physical layer. Layer 2 is a data-link layer for setting up links across a physical network and placing packets into network frames. For example, Ethernet operates at the Layer 2 level. Layer 3 is a network layer that is used for routing of data at the packet level. For example, IP is the network layer used by the Internet. Layer 4 is a transport layer used for end-to-end delivery of packets for both connectionless and connection based modes of communication. An example of a Layer 4 connection based mode of communication is communication over a Transmission Control Protocol (TCP) connection. An example of a connectionless mode of communication is over a User Data Protocol (UDP) datagram. The endpoints of TCP and UDP connections are identified by port numbers. Layer 5 is a session layer used for setting up, coordinating and terminating conversations (e.g., synchronizing message delivery), providing authentication, and performing reconnection if an interruption occurs. Layer 6 is a presentation layer used for converting data from one presentation format to another presentation format. Layer 7 is an application layer used for providing services used by applications to establish, release and abort communication with each other. For example, File Transfer Protocol (FTP), Simple Mail Transfer Protocol (SMTP), Hyper Text Transfer Protocol (HTTP), etc., operate at Layer 7.

Note that the executing of orders for physical changes at the bulk (e.g., pipe) level, e.g., for a connectivity at a patch panel, impacts customer circuits for a duration of time, such as for the duration of the maintenance window. Thus, the activities for the bulk migration are managed and tracked via the bulk migration tool to minimize impact on customer circuits and to reduce the risk of outages beyond the maintenance window.

In one embodiment, in order to enable the coordinated management and tracking, the bulk migration tool may include: a component for managing workflows, a component for a Graphical User Interface (GUI) for interacting with the bulk migration tool, and a component for performing the bulk migrations.

In one embodiment, the GUI is used by personnel of the service provider to issue orders, execute orders, perform verifications, view progress, etc. For example, the GUI can also be used to provide reports and to view migration status.

In one embodiment, the component for managing workflows may be tasked with coordinating activities within the service provider network, coordinating activities with customers (e.g., in case the customer also has an upgrade at the same time), enabling personnel to view statuses of activities, performing verifications on connectivity, handling rollbacks, handling exceptions when rollbacks are not preferred, updating other network components (e.g., databases), etc. For instance, readiness of the Layer 1 network may be coordinated with activities that are performed at the Layer 3 level, testing of physical connectivity may be performed in a coordinated manner, and so on.

In one embodiment, the component that performs the migrations may have one or more modules for handling the bulk migrations for specific network devices, ports, etc. In one embodiment, the component of the network to be migrated is defined by the service provider. For example, the service provider may define a particular module for: performing migration from a router platform to another router platform or performing port level optical swings.

The port level optical swing of the present disclosure refers to a capability to migrate standardized Optical Carrier (OC) ports or channelized optical carrier (CHOC) circuit at an optical level. For example, a Synchronous Optical Network (SONET) may be used to support services via one or more standardized Optical Carrier (OC) ports, e.g., OC-3, OC-12, OC-48, OC-192, or OC-768 ports and channelized Optical Carrier—e.g., CHOC-12, CHOC48. For an illustrative example, port may be for supporting a CHOC-12 circuit that may be carrying numerous customer circuits based on the type of channelization. For instance, twelve customer circuits with each customer circuit transmitting 51.84 Mbits/sec, four customer circuits with each customer circuit transmitting 155.52 Mbits/sec, etc., may be riding on the CHOC-12 circuit. The port level optical swing of the current disclosure swings the port, e.g., OC-3 port, OC-12 port, OC-48 port, OC-192 port or OC-768 port, at the optical level. The various customer circuits riding the optical circuit, e.g., CHOC-3, CHOC-12, CHOC-48, CHOC-192, or CH-768 circuit, are moved from a source router to a target router at the same time.

In one embodiment, each module of the component that performs the migrations comprises one or more configurations for migrating a network component for which the module is intended to be used. For an illustrative example, suppose the module is intended to be used for migrating from a first router platform to a second router platform, wherein the first router platform is a source router platform and the second router platform is the target router platform. Then, the module comprises configurations for the source router platform, configurations for the target router platform, details of port configurations on the source and target router platforms, configurations for services supported by the source and the target router platforms (e.g., configurations for service level details of a Managed Internet Service (MIS)), and the like.

In another illustrative example, suppose the bulk migration is for moving MIS services from ports on the Gigabit Switch Router (GSR) to ports on an Aggregation Services Router (ASR) of a next generation network. The module of the bulk migration tool may then comprise configurations for migrating managed internet services from the GSR platform to the ASR platform. Note that in order to facilitate migrating the MIS ports from the GSR to the ASR within the maintenance window, the GSR and ASR are co-located in one example.

In one embodiment, the network service provider may add any number of modules to the bulk migration tool to address migrations of various types of networks, network components, and/or network services. For example, a pipe swing may be performed at a Light Guide Cross-connect (LGX) interface for Ethernet traffic (e.g., 1 GbE Ethernet service). The LGX may be located between an Ethernet Gateway Switch (EGS) and a Provider Edge (PE) router.

Returning to the component for managing workflows, in one embodiment, the coordination of activities within the service provider network may be for activities that include pre-migration activities, for activities scheduled during cutover, and for post migration activities. The pre-migration activities may include installations of new network components (e.g., new routers, ports, or any other network equipment), extraction of configuration data from source equipment, e.g., source router, connecting the newly installed network equipment to other network components, e.g., connecting routers to LGXs, performing wiring in the physical locations, e.g., central offices that can be performed prior to cutover. The activities scheduled during cutover may include triggering a bulk migration via the bulk migration tool of the present disclosure, directing onsite workforce to make physical changes, e.g., move cables to newly installed equipment, updating global route tables, e.g., to indicate the customer circuits are now being served via the newly installed router, shutting down service on a source equipment that is no longer being used, verifying connectivity in accordance with status of activities gathered during the extraction of configuration data from the source equipment, performing rollbacks if a threshold of successful bulk migration is not reached, handling exceptions if the threshold of successful bulk migrations is reached with less than 100% success rate, etc. The post migration activities may include sending notifications to work centers when the bulk migration activity is completed, updating statuses of customer and network circuits to reflect that the circuits on the new equipment are now in-effect.

For an illustrative example, by coordinating the pre-migration activities, activities scheduled during cutover, and post migration activities, the port level optical swing may be performed within a maintenance window of time. The optical swing is performed from a port of one router to a port of another router within the maintenance window of time, by co-locating the source and target routers, retaining existing customer profiles, retaining existing customer IP addresses during the migration, and updating databases to reflect that the customer circuits have been moved to the new router when the migration is completed.

In one embodiment, the coordination of activities within the service provider network may be for planning individual bulk migration projects, coordinating across multiple bulk migration projects (e.g., traffic being moved from multiple source routers to multiple target routers), resolving pre-cutover discords (e.g., when extracted configuration data is inconsistent with expected data), allocating workforce (e.g., onsite workforce) and scheduling, coordinating work on several layers of the network, updating network databases, and so on.

Although the above illustrative examples describe various components and modules of the bulk migration tool, the method of the present disclosure may be implemented on any number of systems or processors. As such, the descriptions above and the illustrative examples are not intended to be limitations on the present disclosure.

FIG. 1 illustrates an example network 100 related to the present disclosure. In one illustrative embodiment, the network 100 comprises user endpoint devices 111-112, access networks 101-102, a core network 103. The user endpoint devices 111-112 may access services, e.g., Internet services, from the core network 103 via an access network 101 or 102.

The access networks 101-102 may comprise a Wireless-Fidelity (Wi-Fi) network, a cellular network (e.g., 2G, 3G, and the like), a long term evolution (LTE) network, and the like. The core network 103 may comprise any type of communications network, such as for example, a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, or a wireless network. It should be noted that an IP network is broadly defined as a network that uses Internet Protocol to exchange data packets.

Figure 4:
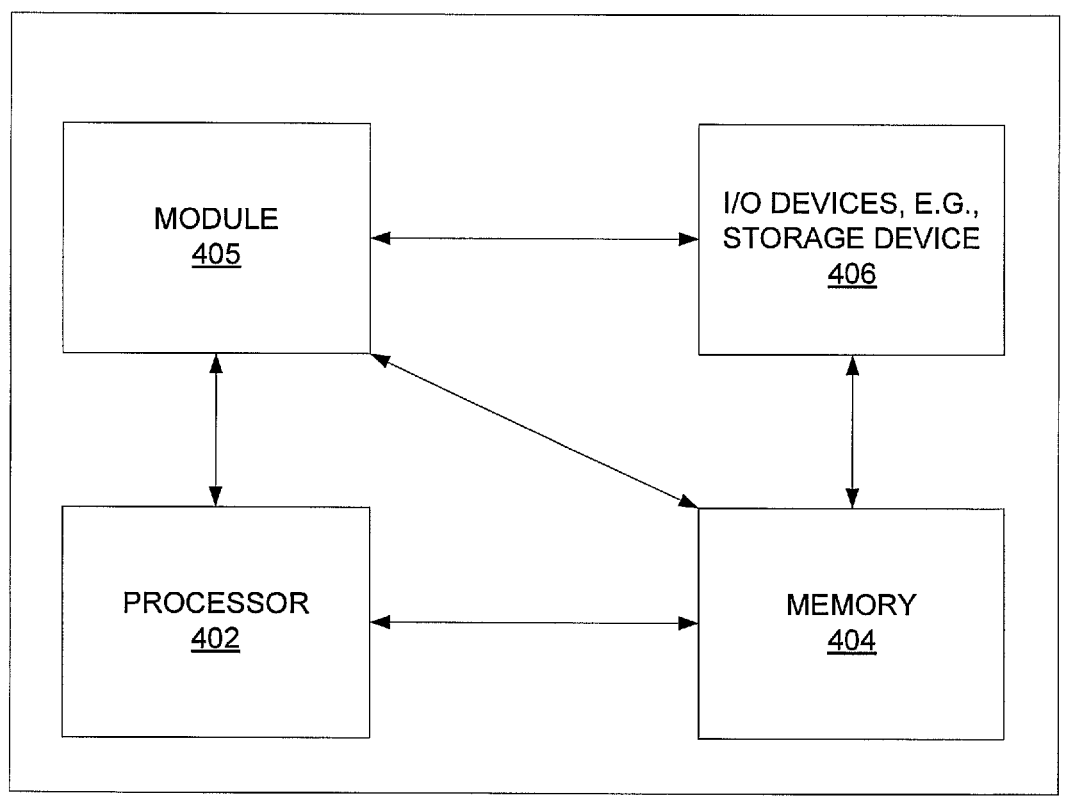
FIG. 4 depicts a high-level block diagram of a computer suitable for use in performing the functions described herein.

In one embodiment, the core network 103 may include an application server (AS) 104, and a database 105. For example, the AS 104 may be deployed as a hardware device embodied as a dedicated database server (e.g., the dedicated computer 400 as illustrated in FIG. 4). In one embodiment, the AS 104 is configured to perform the methods and functions described herein (e.g., the method 300 discussed below).

It should be noted that the network 100 may include additional networks and/or elements that are not shown to simplify FIG. 1. For example, the access network and the core network of FIG. 1 may include additional network elements (not shown), such as for example, base stations, border elements, cross-connects (e.g., light guide cross connects), gateways, firewalls, routers, switches, call control elements, various application servers, and the like.

In one embodiment, the database 105 is used for storing various data, e.g., customer profiles (e.g., IP addresses), customer circuit data, configuration data for customer and service provider network, etc. In one embodiment, the AS 104 is used for providing a bulk migration tool. The AS 104 of the present disclosure is for: receiving a request for performing a particular bulk migration from an "existing" or "previous" network component (broadly a first or source network component or element) to a "new" or "subsequent" network component (broadly a second or target network component or element), performing pre-migration activities, extracting configurations from the previous network component, verifying the configurations that are extracted from the previous network component, determining if inconsistencies are discovered, resolving the inconsistencies when inconsistencies are discovered, generating configurations for the new network equipment in a configuration language of the new network equipment in accordance with the configurations extracted from the previous network component, configuring the new network component with the configurations that are generated, creating orders for performing the particular bulk migration, wherein the particular bulk migration is to be performed during a cutover schedule, determining if the particular bulk migration is performed successfully, activating the configurations for the new equipment and deactivating the configurations for the source router when the particular bulk migration is performed successfully, updating one or more databases in accordance with the particular bulk migration when the particular bulk migration is performed successfully, and/or performing one or more safety procedures when the particular bulk migration is not performed successfully. It should be noted that the use of the terms "existing," "previous," "first," "source," "new," "subsequent," "second," and "target," are only illustrative to distinguish between two different network components and can be used interchangeably.

Figure 2:
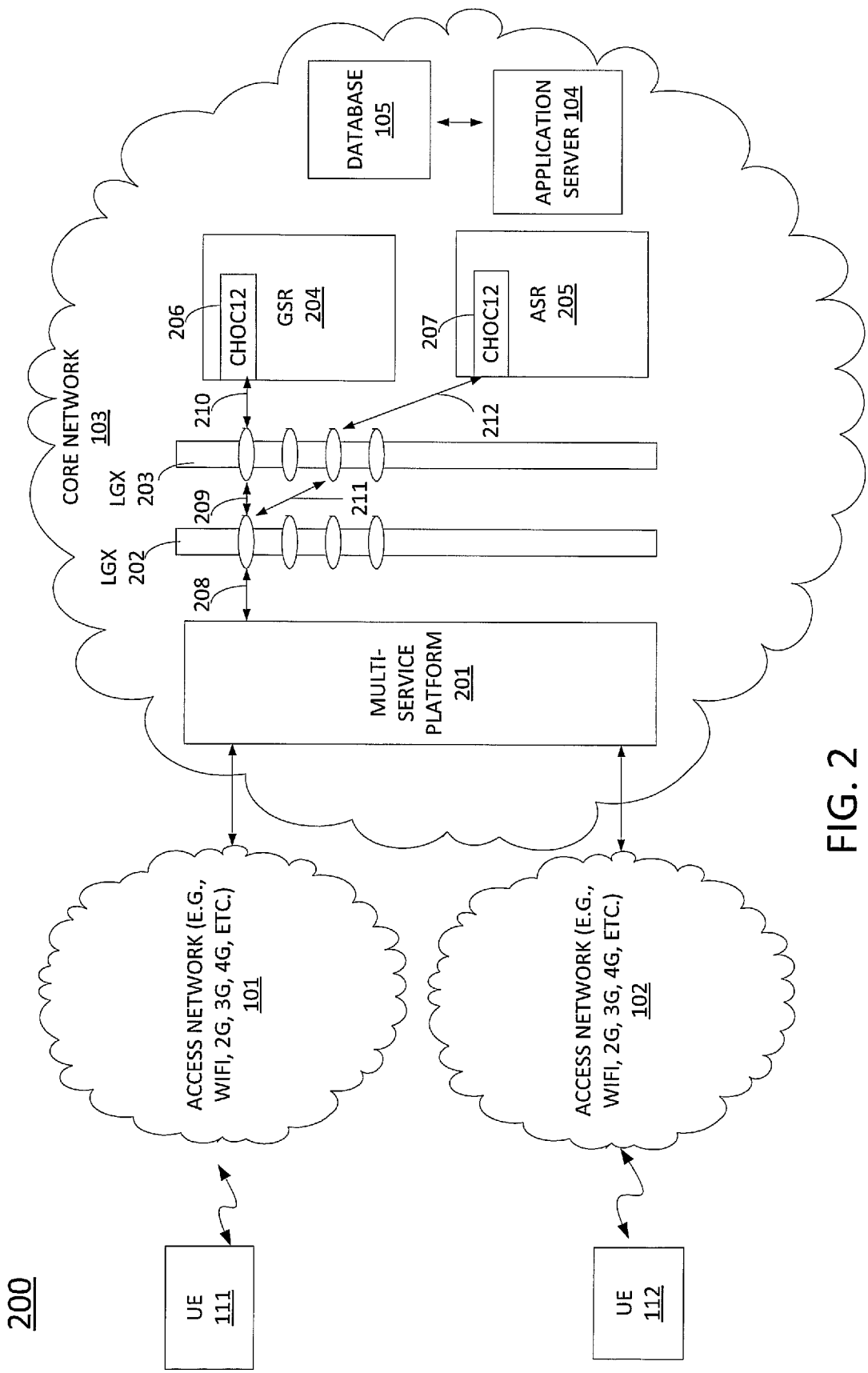
FIG. 2 illustrates an example network that illustrates a bulk migration from a source router to a target router.

FIG. 2 provides an example network 200 that illustrates a bulk migration from a source router to a target router. The network 200 comprises the user endpoint devices 111-112, the access networks 101-102, and the core network 103. The user endpoint devices 111 and 112 access services via a Multi Service Platform (MSP) 201 of the core network 103. LGXs 202 and 203 are used to connect various network components (e.g., MSPs, routers, etc.) in the core network 103. The core network 103 may comprise a GSR 204 and an ASR 205, which are a source router and a target router, respectively, for the current bulk migration example. The GSR 204 may comprise an optical port 206. Similarly, the ASR 205 may comprise an optical port 207. The optical ports 206 and 207 are to be used for channelized OC-12 (CHOC12) services. Prior to the bulk migration, the source router (GSR 204) is communicatively coupled to MSP 201 via connection (e.g., optical cable) 208, LGX 202, connection 209, LGX 203, and connection 210. When the bulk migration is completed in accordance with the method of the present disclosure, the target router (ASR 205) is to be coupled to MSP 201 via connection (e.g., optical cable) 208, LGX 202, connection 211, LGX 203 and connection 212. The bulk migration occurs during a maintenance window without changing the configurations for UEs 111 and 112. For example, the IP addresses of UEs 111 and 112 remain the same as they were prior to the migration.

Figure 3:
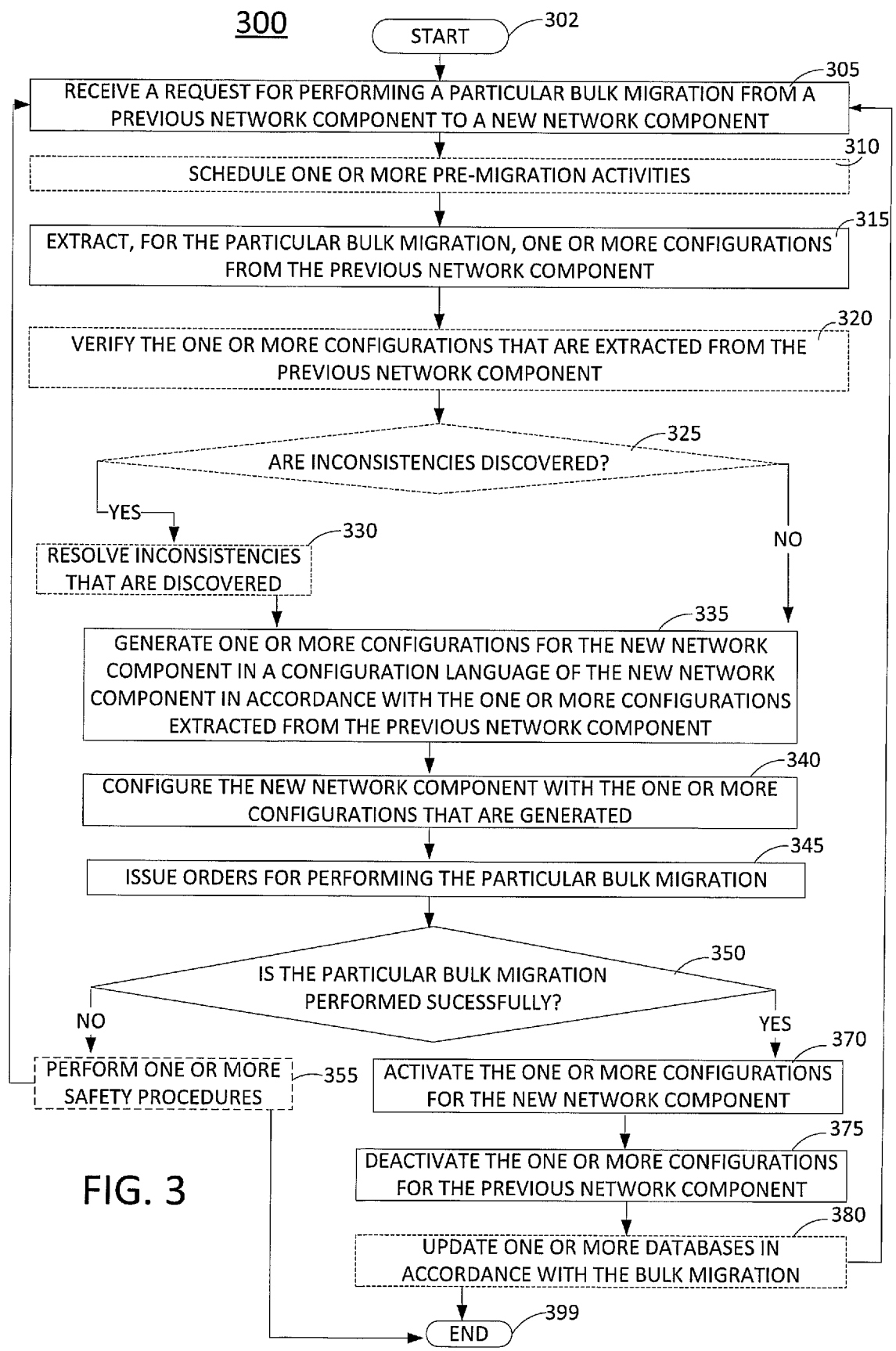
FIG. 3 illustrates a flowchart of an example method for providing a bulk migration tool for a network.

FIG. 3 illustrates a flowchart of an example method 300 for providing a bulk migration tool for a network in accordance with the present disclosure. In one embodiment, the method 300 may be implemented in an application server 104, e.g., as a dedicated bulk migration tool for performing the bulk migrations or in the processor 402 as described in FIG. 4. In one embodiment, the bulk migration tool may be implemented in an application server 104 for performing the bulk migrations in accordance with the teachings of the present disclosure. The method 300 starts in step 302 and proceeds to step 305.

In step 305, the processor receives a request for performing a particular bulk migration from an existing or previous network component to a new or subsequent network component. For example, the bulk migration tool receives a request for migrating MIS services from a particular source router to a particular target router. In another example, the bulk migration tool may receive a request for migrating from a particular optical port to another optical port. Note that a network component may be any equipment used in a network. Thus, the network component may also be referred to as a network equipment or network element.

In optional step 310, the processor, for the particular bulk migration, orders or schedules the performing of pre-migration activities that may comprise one or more of: an installation activity of the new network component, a connection activity of the new network component, an activity for taking inventory of connections, and an activity for wiring and so on. For the example above, if the particular bulk migration is for moving customers from the source router to the target router, the method orders or schedules the installation of the target router, wherein the target router is co-located with the source router, connects the target router to a network panel, e.g., an LGX panel, orders or schedules the taking of inventory of a connectivity of the target router to the network panel in a database, and orders or schedules the performing of all wirings that may be done prior to a cutover schedule.

In step 315, the processor, for the particular bulk migration, extracts one or more configurations from the previous network component, e.g., the source router. For example, the bulk migration tool extracts current IP addresses of customers, one or more configurations for supporting the customers, etc., in a configuration language of the source router.

In one embodiment, the extracting further comprises capturing an active status of each circuit on the previous network component. The extracting of the one or more configurations and capturing the active statuses avoids reliance on provisioning data that may not reflect the most current configuration and/or status that is in effect when the bulk migration is started. Since the migration is occurring during a maintenance window, knowing the most current configurations and statuses may enable the customer services to resume on the new network component without being impacted.

In optional step 320, the processor verifies the one or more configurations that are extracted from the previous network component. In one embodiment, the verifying is performed by comparing each of the one or more configurations that are extracted against a respective configuration stored in a database. For example, a configuration that is extracted may be compared to a configuration stored in a provisioning database, in a database used by a billing system, in a database used by a network management system, etc. Note that a configuration that is extracted may be compared to various configurations in various databases. Thus, the verifying is not limited to being against one particular type of database.

In optional step 325, the processor determines whether inconsistencies are discovered. If inconsistencies are discovered, the method proceeds to step 330. Otherwise, the method proceeds to step 335.

In optional step 330, the processor resolves the inconsistencies that are discovered. For example, the processors addresses the discords between the extracted one or more configurations and one or more configurations stored in various databases prior to generating the one or more configurations that will be used on the new network component, e.g., the target router. The method then proceeds to step 335.

In step 335, the processor, for the particular bulk migration, generates one or more configurations for the new network component in a configuration language of the new network component in accordance with the one or more configurations extracted from the previous network component. For the example above, the method reuses the IP addresses and one or more configurations gathered from the source router, translates the one or more configurations gathered from the source router to the configuration language of the target router, and generates configuration files for the target router in the configuration language of the target router with the same IP addresses extracted from the source router. If any of the optional steps 320, 325 and 330 are performed, the generating of the one or more configurations for the new network component is in accordance with resolutions of any inconsistencies in the one or more configurations that are extracted from the previous network component. For example, if a particular extracted configuration was found as being inaccurate, the resolving of the inconsistency corrects the inaccuracy. Then, the generating is performed with the configuration that is corrected.

In step 340, the processor configures the new network component with the one or more configurations that are generated. For the example above, once the one or more configurations are generated for the target router in the language of the target router, the method executes the actual one or more configurations.

In step 345, the processor issues orders for performing the particular bulk migration, wherein the particular bulk migration is to be performed during a cutover schedule, e.g., a predefined time period. For example, the processor creates and issues orders for performing changes on a connectivity during a cutover schedule. For instance, the bulk migration tool may create and issue orders for directing onsite workforce to move wiring during the cutover schedule. The order may be for activities to be performed at a patch panel, e.g., an LGX, to move an optical cable from the old network component to the new network component, etc.

The onsite workforce then receives the orders and performs the changes on the connectivity in accordance with the orders during the cutover schedule, wherein the cutover schedule is during a maintenance window of time. For example, the bulk migration tool may be used to orchestrate executing of the orders for performing the changes via a workflow and GUI of the bulk migration tool.

In step 350, the processor determines whether the particular bulk migration is performed successfully. If the particular bulk migration is performed successfully, the method proceeds to step 370. Otherwise, the method proceeds to step 355.

In one embodiment, the determining of whether the particular bulk migration is performed successfully may be made by performing one or more automated tests for verifying a connectivity of each circuit when the cutover is completed. In one embodiment, the verifying of the connectivity for a particular circuit includes comparing, for the particular circuit, an active status of the particular circuit on the new network component against a respective active status of the circuit that was captured from the previous network component.

In optional step 355, the processor performs one or more safety procedures. In one embodiment, the one or more safety procedures comprise: rolling back to the previous network component using the one or more configurations that were extracted from the previous network component, verifying that the rolling back is performed successfully, identifying particular circuits that failed to be migrated properly, providing an output that includes a list of particular circuits that failed to be migrated properly, providing a report for handling fallouts, and so on. The rolling back to the previous network component is for returning the circuits (customer and network circuits) to their respective initial states. In one embodiment, the rolling back is performed in accordance with a minimum threshold for a percentage of successful connectivity tests. For example, a network service provider may wish to handle exceptions via another method for handling fallouts, if only a few connectivity tests on customer circuits are found as being unsuccessful. In contrast, if a large number of customer circuits fail to pass the connectivity tests, the network service provider may perform the rollback, perform a remediation activity, and then proceed with another attempt to perform the bulk migration during another maintenance window. The method then either returns to step 305, or to step 399 to end the process.

In step 370, the processor activates the one or more configurations for the new network component. For the example above, the method activates the target router in accordance with the one or more configurations that are generated for the target router.

In step 375, the processor deactivates the one or more configurations for the previous network component. For the example above, the method deactivates the source router.

In optional step 380, the processor updates one or more databases to in accordance with the particular bulk migration when the particular bulk migration is performed successfully. For the example above, the method updates databases to reflect the bulk migration of all circuits from the source router to the target router. For instance, databases associated with provisioning systems for provisioning customer circuits and/or databases associated with provisioning systems for provisioning network circuits (e.g., CHOC circuits) may be updated in accordance with the CHOC and customer circuits being moved to the target router. The method then either returns to step 305, or to step 399 to end the process.

In one example, the present method for providing a bulk migration tool of the present disclosure is implemented via a dedicated database server. Furthermore, in one embodiment, the present method for providing a bulk migration tool can be provided in the dedicated server, e.g., AS 104, operated and managed by a network service provider. For example, the network service provider may operate one or more networks to provide one or more services such as telephony services, cellular services, data services (e.g., data access and transfer services, Internet access services, and the like), multimedia delivery services (e.g., multimedia programming delivery services such as movies, videos, music and the like), and the like.

As such, the present disclosure provides at least one advancement in the technical field of providing bulk migration. This advancement improves customer experience while enabling the service provider to modernize the network, e.g., by migrating customer circuits and services to newer network components. The modernization of the network is performed without affecting customer configurations and without requiring actions to be performed by the customers.

FIG. 4 depicts a high-level block diagram of a computer suitable for use in performing the functions described herein. As depicted in FIG. 4, the system 400 comprises one or more hardware processor elements 402 (e.g., a central processing unit (CPU), a microprocessor, or a multi-core processor), a memory 404, e.g., random access memory (RAM) and/or read only memory (ROM), a module 405 for providing a bulk migration tool, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method 300 as discussed above is implemented in a distributed or parallel manner for a particular illustrative example, i.e., the steps of the above method 300, or each of the entire method 300 is implemented across multiple or parallel computers, then the computer of this figure is intended to represent each of those multiple computers.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computer or any other hardware equivalents, e.g., computer readable instructions pertaining to the method(s) discussed above can be used to configure a hardware processor to perform the steps, functions and/or operations of the above disclosed method.

In one embodiment, instructions and data for the present module or process 405 for providing a bulk migration tool (e.g., a software program comprising computer-executable instructions) can be loaded into memory 404 and executed by hardware processor element 402 to implement the steps, functions or operations as discussed above in connection with the illustrative method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for providing a bulk migration tool (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method comprising:
   receiving, via a processor, a request for performing a bulk migration of customer circuits from a first router to a second router, wherein each customer circuit of the customer circuits comprises a physical electrical connection or a physical optical connection of a physical layer of a customer endpoint device to a network service provider device, wherein the bulk migration of the customer circuits from the first router to the second router comprises a physical change of a connectivity of the physical electrical connection or the physical optical connection from the first router to the second router;
   extracting, via the processor, for the bulk migration one or more configurations from the first router;
   generating, via the processor, for the bulk migration, one or more configurations for the second router in a configuration language of the second router in accordance with the one or more configurations extracted from the first router;
   configuring, via the processor, the second router with the one or more configurations that are generated;
   issuing, via the processor, an order for performing the bulk migration, wherein the bulk migration is to be performed during a cutover schedule;
   determining, via the processor, whether the particular bulk migration is performed successfully;
   activating, via the processor, the one or more configurations for the second router, when the bulk migration is performed successfully; and
   deactivating, via the processor, the one or more configurations for the first router, when the bulk migration is performed successfully.

2. The method of claim 1, further comprising:
   scheduling at least one pre-migration activity.

3. The method of claim 2, wherein the at least one pre-migration activity comprises one or more of: an installation activity of the second router, a connection activity of the second router, an activity for taking an inventory of a physical electrical connection or a physical optical connection, and an activity for wiring.

4. The method of claim 1, wherein the extracting further comprises capturing an active status of each of the customer circuits on the first router.

5. The method of claim 1, further comprising:
   verifying the one or more configurations that are extracted from the first router.

6. The method of claim 5, wherein the verifying is performed by comparing each of the one or more configurations that is extracted against a respective configuration stored in a database.

7. The method of claim 6, further comprising:
   discovering an inconsistency; and
   resolving the inconsistency.

8. The method of claim 7, wherein the generating the one or more configurations for the second router is further in accordance with the inconsistency being resolved.

9. The method of claim 1, wherein the determining of whether the bulk migration is performed successfully is made by performing one or more automated tests for verifying the connectivity of each of the customer circuits when a cutover is completed.

10. The method of claim 9, wherein the verifying the connectivity for each customer circuit comprises comparing, for each of the customer circuits, an active status of each of the customer circuits on the second router against a respective active status of each of the customer circuits that was captured from the first router.

11. The method of claim 1, further comprising:
   performing one or more safety procedures, when the bulk migration is not performed successfully.

12. The method of claim 11, wherein the one or more safety procedures comprise rolling back to the first router using the one or more configurations that were extracted from the first router.

13. The method of claim 12, wherein the rolling back is performed in accordance with a minimum threshold for a percentage of successful connectivity tests.

14. The method of claim 12, further comprising:
verifying that the rolling back is performed successfully.

15. The method of claim 11, wherein the one or more safety procedures comprise one or more of:
identifying a particular component that failed to be migrated properly;
providing an output that includes a list of the particular component that failed to be migrated properly; and
providing a report for handling fallouts.

16. The method of claim 1, further comprising:
updating one or more databases in accordance with the bulk migration, when the bulk migration is performed successfully.

17. The method of claim 1, wherein the bulk migration comprises a pipe based migration that performs the bulk migration without altering a configuration on the customer endpoint device.

18. The method of claim 17, wherein the configuration on the customer endpoint device that is not altered comprises an internet protocol address associated with the customer endpoint device.

19. A non-transitory computer-readable storage device storing a plurality of instructions which, when executed by a processor, cause the processor to perform operations, the operations comprising:
receiving a request for performing a bulk migration of customer circuits from a first router to a second router, wherein each customer circuit of the customer circuits comprises a physical electrical connection or a physical optical connection of a physical layer of a customer endpoint device to a network service provider device, wherein the bulk migration of the customer circuits from the first router to the second router comprises a physical change of a connectivity of the physical electrical connection or the physical optical connection from the first router to the second router;
extracting for the bulk migration one or more configurations from the first router;
generating for the bulk migration, one or more configurations for the second router in a configuration language of the second router in accordance with the one or more configurations extracted from the first router;
configuring the second router with the one or more configurations that are generated;
issuing an order for performing the bulk migration, wherein the bulk migration is to be performed during a cutover schedule;
determining whether the particular bulk migration is performed successfully;
activating the one or more configurations for the second router, when the bulk migration is performed successfully; and
deactivating the one or more configurations for the first router, when the bulk migration is performed successfully.

20. An apparatus comprising:
a processor; and
a computer-readable storage device storing a plurality of instructions which, when executed by the processor, cause the processor to perform operations, the operations comprising:
receiving a request for performing a bulk migration of customer circuits from a first router to a second router, wherein each customer circuit of the customer circuits comprises a physical electrical connection or a physical optical connection of a physical layer of a customer endpoint device to a network service provider device, wherein the bulk migration of the customer circuits from the first router to the second router comprises a physical change of a connectivity of the physical electrical connection or the physical optical connection from the first router to the second router;
extracting for the bulk migration one or more configurations from the first router;
generating for the bulk migration, one or more configurations for the second router in a configuration language of the second router in accordance with the one or more configurations extracted from the first router;
configuring the second router with the one or more configurations that are generated;
issuing an order for performing the bulk migration, wherein the bulk migration is to be performed during a cutover schedule;
determining whether the particular bulk migration is performed successfully;
activating the one or more configurations for the second router, when the bulk migration is performed successfully; and
deactivating the one or more configurations for the first router, when the bulk migration is performed successfully.

* * * * *